United States Patent [19]

Kallenbach et al.

[11] Patent Number: 5,536,706
[45] Date of Patent: Jul. 16, 1996

[54] USE OF BUTADIENE-STYRENE COPOLYMERS IN CRUDE OILS

[75] Inventors: Lyle R. Kallenbach; Marvin M. Johnson; Howard F. Efner, all of Bartlesville, Okla.

[73] Assignee: Phillips Petroleum Company, Bartlesville, Okla.

[21] Appl. No.: 300,823

[22] Filed: Sep. 2, 1994

[51] Int. Cl.$^6$ .................................................... F21B 37/06
[52] U.S. Cl. .......................... 507/231; 507/931; 137/13; 166/304
[58] Field of Search ................................ 507/931, 231; 137/13; 166/304

[56] References Cited

U.S. PATENT DOCUMENTS

| | | | |
|---|---|---|---|
| 3,635,685 | 1/1972 | Sonnenfeld | 65/94 X |
| 4,367,325 | 1/1983 | Takeuchi et al. | 526/340 |
| 4,412,087 | 10/1983 | Trepka | 585/12 |

*Primary Examiner*—Sharon A. Gibson
*Assistant Examiner*—Valerie Fee
*Attorney, Agent, or Firm*—Lucas K. Shay

[57] ABSTRACT

A process for inhibiting the deposition or precipitation of wax in a hydrocarbon fluid such as, for example, a crude oil, and for operating a pipeline is disclosed. The process comprises combining an effective amount of a polymer with the hydrocarbon fluid wherein the polymer comprises random repeat unit of butadiene. Also provided is a composition which comprises a hydrocarbon fluid and a random copolymer which comprises repeat units of styrene and butadiene.

41 Claims, No Drawings

USE OF BUTADIENE-STYRENE COPOLYMERS IN CRUDE OILS

FIELD OF THE INVENTION

The present invention relates to the use of random butadiene-styrene copolymers as wax suppressants in a hydrocarbon fluid such as crude oil.

BACKGROUND OF THE INVENTION

A hydrocarbon fluid such as, for example, crude oil is a complex and variable mixture of many organic molecules, but mainly, hydrocarbons ranging from low molecular weight alkanes to high molecular weight compounds such as, for example, waxes and asphaltenes. Generally, the high molecular weight paraffins are soluble under normal reservoir conditions. However, as Carnahan discloses in the October 1989 issue of J. Pet. Technol. (pages 1024–1025, 1106), the high molecular weight paraffins may precipitate in production wells and equipment if the thermodynamic equilibrium of the crude oil is disturbed, for example, by changes in pressure and temperature. Paraffin precipitation and crystal growth increases the viscosity of crude oil for transportation and forms deposits inside production tubing and transportation pipelines. Transportation can be disrupted when the paraffin buildup becomes excessive and the flow is restricted or completely stopped. Consequently, the operation has to be shut in to remove the buildup, or in some cases, abandoned.

Many procedures have been developed to control paraffin precipitation. For example, in wire lining tubing, precipitates inside the production tubing can be mechanically cut by running a scraper. Pigging operations are used to mechanically remove deposits from transportation pipelines. Paraffin precipitation can also be prevented by either heating or insulating the production and transportation systems. Various chemical treatments, such as, for example, solvents, polymers, surfactants, and dispersants have been used to prevent paraffin deposition. Each of these procedures has its own disadvantages. For example, polymers known for wax crystal modification generally only work in low water content crude oils and are tailored to the specific crude oil.

Therefore it would be a significant contribution to the art if a process were developed in which wax deposition was controlled during the production, or transportation, or both, of crude oil.

SUMMARY OF THE INVENTION

An object of the invention is to provide a process for reducing the deposition of paraffinic material in pipelines during the transportation of a hydrocarbon fluid such as a crude oil. Another object of the invention is to provide a process for reducing the formation of paraffinic deposits inside production tubing during the production of a hydrocarbon fluid such as a crude oil. Another object of the invention is to provide a process for using a random butadiene-styrene copolymer in a hydrocarbon fluid such as a crude oil. A further object of the present invention is to provide a composition which comprises a hydrocarbon fluid such as a crude oil and a random butadiene-styrene copolymer which has reduced paraffin deposition in pipelines during transportation of the composition. An advantage of the present invention is that there is no need to separate the random butadiene-styrene copolymer before a hydrocarbon fluid such as a crude oil is delivered to a refining process.

According to a first embodiment of the present invention, a process is provided which comprises combining a polymer with a hydrocarbon fluid wherein the polymer comprises random repeat units of butadiene and styrene and is present in an effective amount sufficient to inhibit the precipitation or deposition of wax.

According to a second embodiment of the present invention, a composition is provided which comprises a hydrocarbon fluid and a random copolymer comprising repeat units of butadiene and styrene wherein the copolymer is present in an effective amount sufficient to inhibit the precipitation or deposition of wax.

DETAILED DESCRIPTION OF THE INVENTION

According to the first embodiment of the present invention, a process useful in the production and transportation of a hydrocarbon fluid is provided which comprises combining a hydrocarbon fluid with a polymer composed of random repeat units of butadiene and styrene. It can be used, for example, for reducing wax deposition in pipelines used for the transportation of hydrocarbon fluids. A secondary benefit of the present invention may be the depression of the pour point of a crude oil.

The term "polymer" as used in this invention denotes copolymers, or terpolymers, or tetrapolymers or combinations of two or more thereof. The presently preferred polymer is a random copolymer. The term "polymer" can also be used to referred to as a polymer which has been partially hydrogenated or completely hydrogenated. An example of a polymer which is partially hydrogenated is a butadiene-styrene polymer in which only the ethylenic linkages are hydrogenated. An example of a polymer which is completely hydrogenated is a butadiene-styrene polymer in which substantially all unsaturation, including the phenyl group, is hydrogenated. Polymers useful in this invention can be prepared by known methods. The preparation of random butadiene-styrene copolymers is disclosed in U.S. Pat. No. 3,554,911, disclosure of which is incorporated herein by reference. A fixed bed process for hydrogenating butadiene-styrene copolymers is disclosed in U.S. Pat. No.4,629,767, disclosure of which is incorporated herein by reference. For a partially hydrogenated polymer, the percentage of ethylenic linkages that become saturated can be in the range of from about 1% to about 100%, preferably about 5% to about 100%, and most preferably 10% to 100%. For a fully hydrogenated polymer, the percentage of aromatic unsaturation that becomes saturated can be in the range of from about 1% to about 100%, preferably about 50% to about 100%, and most preferably 80% to 100%. The presently preferred polymer is a partially or completely, hydrogenated polymer.

According to the first embodiment of the invention, the term "hydrocarbon fluid" refers to, unless otherwise indicated, unrefined petroleum products such as, for example, crude oil. Examples of hydrocarbon fluids include, but are not limited to, crude oils, shale oils, gas well condensates, synthetic crude oils, and mixtures thereof. The presently preferred hydrocarbon fluid is a crude oil.

According to the process of the invention, any molar ratio of butadiene to styrene can be employed as long as the ratio provides a polymer that is effective for reducing the precipitation of wax, or the deposition of wax in tubing or pipelines, or both, during the production, processing, or transportation of a crude oil. The molar ratio of butadiene to styrene is generally in the range from about 90:10 to about 10:90, preferably about 70:30 to about 25:75, and more preferably 60:40 to 30:70. A presently most preferred polymer, for some Gulf Coast crude oils, is a partially hydrogenated random copolymer of butadiene and styrene having a molar ratio of butadiene to styrene in the range of from 60:40 to 30:70. For optimum performance, the composition and properties of the polymer needs to be tailored to the specific hydrocarbon fluid.

The polymer can be present in the hydrocarbon fluid at any concentration so long as that concentration is effective in reducing the precipitation or deposition of wax in the oil to which the polymer is added. For example, the concentration can be in the range of from about 1 part by weight of polymer per million parts of oil (ppm) to about 20,000 ppm, preferably about 10 ppm to about 10,000, and most preferably 20 ppm to 5000 ppm.

Generally, the polymer used in the invention can be of any molecular weight so long as the polymer can be dispersed in the hydrocarbon fluid under the conditions for handling the hydrocarbon fluid. For example, a polymer having a polystyrene equivalent molecular weight range of from about 500 to about 500,000, preferably about 1000 to about 300,000, and most preferably 25,000 to 200,000 had been found to perform well.

According to the first embodiment of the present invention, the polymer can be added to a hydrocarbon fluid at any point during the production process. For example, the polymer may be added downhole during the production and recovery of the hydrocarbon fluid, at the wellhead, to a produced hydrocarbon fluid either before or during treatment, to the hydrocarbon fluid prior to transportation, or to a flowing hydrocarbon fluid in a conduit such as a pipeline. The polymer can be added to the hydrocarbon fluid either with or without a carrier. Presently, a carrier is preferred. Generally, the carrier is a solvent that is substantially miscible with a hydrocarbon fluid and is capable of substantially dissolving the polymer described above. Examples of suitable solvents include, but are not limited to, aliphatic or aromatic hydrocarbons such as pentane, hexane, cyclohexane, heptane, octane, toluene, xylenes, mesitylene, cumene, or ethylbenzenes; higher alcohols which are alcohols having 4 or more carbon atoms; carbonyl compounds such as acetone, methylethyl ketone, or other carbonyl compounds; ethers such as diethyl ether or tetrahydrofuran; amides such as N,N'-dimethylformamide; refinery streams such as naphtha, aromatic naphtha, kerosene, reformate, heavy reformate, jet fuel, turbine fuel, fuel oil, distillate, heavy distillate, or other refinery products; and mixtures thereof. The presently preferred solvents are toluene, xylenes, heavy reformate, or mixtures thereof because of their availability, cost, and the solubility of the polymer.

According to the second embodiment of the invention, a composition comprising a hydrocarbon fluid, such as crude oil, and a random copolymer of butadiene and styrene is provided. The scope, definition, and concentration of the hydrocarbon fluid and the polymer are the same as those disclosed in the first embodiment of the invention. The composition can be used in the recovery, production, and transportation of the hydrocarbon fluid.

The following examples further illustrate the process of the invention. These examples, however, are not to be construed as to limit the scope of the invention.

EXAMPLE I

This example illustrates the preparation of random butadienestyrene copolymers

The polymer was prepared in a 2 gallon stirred reactor using n-butyllithium as an initiator and tetrahydrofuran as a randomizer. 1,3-Butadiene (338 g), styrene (110 g), tetrahydrofuran (6.4 ml), and cyclohexane (4724 ml) were charged to the reactor. Nitrogen pressure was used to charge the n-butyllithium. The polymerization was allowed to proceed for 30 minutes at 55° C. The reaction mixture was terminated with a stoichiometric amount of isopropanol. The cyclohexane solution was found to contain about 10 wt % random butadiene-styrene copolymer. The three polymers thus-prepared had corrected molecular weights of about 14,000; 27,000; and 55,000 and were designated as random butadiene-styrene copolymers A; B; and C, respectively. Analytical data is found in Table I.

TABLE I

| Analytical Results for Random Butadiene-Styrene Copolymers | | | | |
| --- | --- | --- | --- | --- |
| Polymers | HI[a] | I.V.[b] (calc.) | $M_w$[c] | $M_n$[c] |
| A | 1.02 | 0.322 | 25400 | 24900 |
| B | 1.02 | 0.460 | 46400 | 45700 |
| C | 1.01 | 0.721 | 93600 | 92100 |

[a]HI, heterogeneity index which is determined by gel-permeability chromatography (GPC).
[b]I.V., intrinsic viscosity.
[c]Polystyrene equivalent molecular weight.

A 200 ml portion of each of the above-described random butadiene-styrene copolymers was then partially hydrogenated in a 300 ml stainless steel autoclave using a nickel octoate/triethylaluminum catalyst as described in U.S. Pat. Nos. 3,554,911 and 3,531,448, disclosures of which are incorporated herein by reference.

The random butadiene-styrene copolymer solution was added to a dry, nitrogen purged reactor. An aliquot (0.4 ml) of the hydrogenation catalyst was charged to the reactor using a syringe. The reactor was purged with hydrogen, pressurized with hydrogen, and heated to 176° C. while maintaining a hydrogen pressure of 200 psig. After 2 hours, the reactor was cooled, hydrogen pressure released, the catalyst was quenched with aqueous ammonium phosphate, and the cyclohexane solution of the partially hydrogenated polymer recovered.

The hydrogenated product was analyzed by Fourier Transform Infrared (FTIR) spectroscopy. A sample of 10% (by weight) polymer in cyclohexane was examined both in solution and as cast films. Films were prepared by placing several drops of the sample solution on a KBr plate and allowing the cyclohexane to evaporate.

FTIR analysis of the products showed that the olefinic groups in the polymers were hydrogenated while the aromatic unsaturation remained intact. The three starting polymers A, B, and C produced partially hydrogenated random butadiene-styrene copolymers designated D, E, and F respectively.

For the preparation of fully hydrogenated random butadienestyrene copolymers, it is necessary to use a different catalyst and more severe hydrogenation conditions. Samples of the three random butadiene-styrene copolymers were completely hydrogenated using a 15 weight percent nickel on Hi-Sil® support which is commercially available from PPG Industries Pittsburgh, Pa. The catalyst preparation is described in U.S. Pat. No. 4,629,767. Samples of the random butadiene-styrene copolymers, described above, were completely hydrogenated using about 3 weight percent of the catalyst based on the weight of the contained polymer. The hydrogenations were conducted at 150° C. and 300 psig hydrogen for about 2 hours. The polymer solutions were recovered as described above.

FTIR analysis of the products showed that the olefinic groups and the aromatic groups in the polymers were hydrogenated. The three starting polymers A, B, and C produced fully hydrogenated random butadiene-styrene copolymers designated G, H, and J respectively.

EXAMPLE II

This example illustrates the reduction of wax deposits by the addition of a random butadiene-styrene copolymer to a hydrocarbon fluid.

The runs were carried out with a Gulf Coast pipeline grade crude oil obtained from South Marsh Island Platform 147 (OCS Block OCS-G-6693). The test method was the "cold finger" test which is a widely accepted test method in the industry for the evaluation of additives to control wax deposition from crude oils at temperatures below their cloud point.

The apparatus and test procedure is a modification of the test described by McClaflin and Whitfill (C. G. McClaflin and D. L. Whitfill, Soc. Pet Engineers. Paper 12204, 58lh Annual Technical Conference and Exposition, San Francisco, Calif., Oct. 5–8, 1983) disclosure of which is incorporated herein by reference.

The cold finger apparatus consisted of six cooled ¼ inch stainless steel tubing loops which were immersed in the oil samples. The temperature of the tubing loops was controlled by a circulating water bath. Low pressure steam was used to heat the loops to melt the deposited wax at the end of the test. The oil samples (300 g) were contained in 600 ml stainless steel beakers. Mixing was provided by air driven magnetic stirrers.

Additive "cocktails" were prepared to conveniently treat oil samples with low levels of additives. The cocktails were prepared by dissolving 1.250 g of an additive in toluene and diluting to 50 ml with toluene. With the random butadiene-styrene copolymers of Example I, it was necessary to correct for the presence of the cyclohexane solvent. A 3.0 ml aliquot of the additive cocktail, described above, would treat a 300 g oil sample with 250 ppm of the additive. Additives need to be added to the test oils at temperatures above the cloud point of the respective oil.

Samples of the crude oil (300 g) were weighed into 600 ml stainless steel beakers, treated with the desired quantity of additive by pipetting the quantity of additive cocktail needed and adding it to the oil with the oil temperature being above the cloud point. A magnetic stirring bar was added to each sample, and the test apparatus assembled. One untreated oil sample was included in each test run as a control.

The temperature of the circulating water bath was stabilized at the desired temperature (5° C.), stirrers adjusted as needed, and coolant circulation through the loops was started. The test was allowed to run for 3 hours. After the 3 hours had elapsed, coolant flow was stopped, the beakers were removed from the loops, and the oil was allowed to drain for 30 minutes. Residual oil was washed from the loop deposits with acetone and the acetone was allowed to evaporate for about 10 minutes. Tared aluminum weighing dishes were placed under the loops, low pressure steam was turned on to melt the deposits, and the wax was collected in the weighing dishes. Any remaining wax was transferred from the bottom of the loop to the weighing dish. The quantity of wax was determined after the samples had cooled to room temperature. The percent wax inhibition was calculated as:

% Inhibition=((Control Wt.-Sample Wt.)/Control Wt.)×100%

The results, as shown in Table II below, show that low concentrations of the partially hydrogenated random butadiene-styrene copolymers (polymers D-F) were highly effective in reducing the amount of wax deposited from the crude oil. The fully hydrogenated random butadienestyrene copolymers (polymers G-J) were also effective in reducing wax deposition. The unhydrogenated polymers (polymers A-C) had minimal effect on the wax deposition tendency of this specific crude oil.

TABLE II

Wax Inhibition Using Random Butadiene-Styrene Copolymers

| Polymer[a] | % Inhibition at 50 ppm[b] | % Inhibition at 125 ppm[b] | % Inhibition at 250[b] |
|---|---|---|---|
| A | −10 | —[c] | −44 |
| B | 32 | — | 13 |
| C | 5 | — | 18 |
| D | 62 | 52 | 94 |
| E | 37 | 95 | 100 |
| F | 15 | 100 | 100 |
| G | 24 | 10 | 93 |
| H | 26 | −10 | 94 |
| J | 65 | 99 | 96 |

[a]See Example I for detail.
[b]Parts of polymer (by weight) per million parts crude oil.
[c]—, not determined.

EXAMPLE III

This is a comparative example illustrating wax inhibition using block butadiene-styrene copolymers.

Polymers K and L were diblock butadiene-styrene copolymers prepared by the n-butyllithium initiated polymerization of butadiene and styrene. No randomizer was used in the polymerization. The butadiene to styrene mole ratios were: 25:75 for polymer K, and 30:70 for polymer L.

Partially hydrogenated copolymers M and N were prepared from parent polymers K and L using procedures described in Example I. Fully hydrogenated polymers P and Q were prepared from parent polymers K and L, also using the procedure described in Example I. The cold finger evaluations were carried out as described in Example II except that the above described block copolymers were used.

The data, tabulated below in table III, demonstrate that little or no inhibition of wax depositions was observed with block butadiene-styrene copolymers.

TABLE III

Wax Inhibition Using Block Butadiene-Styrene Copolymers

| Polymer | % Inhibition at 500 ppm[a] | % Inhibition at 250 ppm[a] |
|---|---|---|
| K | 2 | —[b] |
| L | −3 | — |
| M | — | 11 |
| N | — | 15 |
| P | — | −45 |
| Q | — | 13 |

[a]Parts by weight polymer per million parts crude oil.
[b]—, not determined.

EXAMPLE IV

This is a comparative example using some commercially available wax inhibitors.

The runs were carried out as described in Example II except that the additives were obtained commercially. Corrections were not made for the unknown quantity of solvent present in several of the additive packages. The results are shown in Table IV.

TABLE IV

| Wax Inhibition Using Commercial Wax Inhibitors | | |
|---|---|---|
| Additive | % Inhibition at 500 ppm[a] | % Inhibition at 250 ppm[a] |
| VISCO ® 4713[b] | 66 | —[e] |
| Paraflow 170[c] | —[e] | 87 |
| Paraflow 536[d] | —[e] | 100 |

[a]Parts by weight of the additive package per million parts crude oil.
[b]VISCO ® 4713, believed to be an oil soluble polymeric ester, is commercially available from Nalco Chemical Company, Sugarland, Texas.
[c]Paraflow 170, believed to be a copolymer of ethylene and vinyl acetate in heavy aromatic naphtha, is commercially available from Exxon Chemical Company, Houston, Texas.
[d]Paraflow 536, believed to be an olefin copolymer in heavy aromatic naphtha, is commercially available from Exxon Chemical Company, Houston, Texas.
[e]—, not determined.

A comparison of the data in Tables II and IV clearly demonstrates that the invention process of using a random butadiene-styrene copolymer was as good as or better than the commercially available wax inhibitors.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed:

1. A process for inhibiting the precipitation or deposition of wax in a hydrocarbon fluid in oil production or transportation equipment, wherein said process comprises contacting said hydrocarbon fluid with a random copolymer comprising repeat units of butadiene and styrene and being present in an effective amount to inhibit the precipitation or deposition of wax in said hydrocarbon fluid.

2. A process according to claim 1 wherein said hydrocarbon fluid is a crude oil.

3. A process according to claim 1 wherein said polymer is partially hydrogenated.

4. A process according to claim 1 wherein said polymer is completely hydrogenated.

5. A process according to claim 1 wherein said polymer is present in said fluid in the range from about 1 to about 20,000 ppm.

6. A process according to claim 1 wherein said polymer is present in said fluid in the range from about 10 to about 10,000 ppm.

7. A process according to claim 1 wherein said polymer is present in said fluid in the range from about 20 to about 5,000 ppm.

8. A process according to claim 1 wherein the molar ratio of said butadiene to said styrene is in the range from about 90:10 to about 10:90.

9. A process according to claim 1 wherein the molar ratio of said butadiene to said styrene is in the range from about 70:30 to about 25:75.

10. A process according to claim 1 wherein the molar ratio of said butadiene to said styrene is in the range from about 60:40 to about 30:70.

11. A process according to claim 1 wherein the polystyrene equivalent molecular weight of said polymer is in the range of from about 500 to about 500,000.

12. A process according to claim 1 wherein the polystyrene equivalent molecular weight of said polymer is in the range of from about 1,000 to about 300,000.

13. A process according to claim 1 wherein the polystyrene equivalent molecular weight of said polymer is in the range of from about 25,000 to about 200,000.

14. A process according to claim 1 wherein said polymer is dispersed in a solvent before it is combined with said hydrocarbon fluid.

15. A process according to claim 14 wherein said solvent is selected from the group consisting of aliphatic hydrocarbons, aromatic hydrocarbons, and mixtures thereof.

16. A process according to claim 14 wherein said solvent is selected from the group consisting of pentane, hexane, cyclohexane, heptane, octane, toluene, xylenes, mesitylene, cumene, ethylbenzenes, higher alcohols, diethyl ether, tetrahydrofuran, N,N'-dimethylformamide, naphtha, aromatic naphtha, kerosene, reformate, heavy reformate, jet fuel, turbine fuel, fuel oil, distillate, heavy distillate, and mixtures thereof.

17. A process according to claim 14 wherein said solvent is selected from the group consisting cyclohexane, toluene, xylene, and mixtures thereof.

18. A process according to claim 14 wherein said solvent is cyclohexane.

19. A process for inhibiting wax deposition in a pipeline for transporting crude oil comprising adding a random butadiene-styrene copolymer to said crude oil wherein an effective amount of said copolymer is added to effect the inhibition of said wax deposit.

20. A process according to claim 19 wherein said polymer is partially hydrogenated.

21. A process according to claim 19 wherein said polymer is completely hydrogenated.

22. A process according to claim 19 wherein said polymer is present in said crude oil in the range of about 1 to about 20,000 ppm.

23. A process according to claim 19 wherein said polymer is present in said crude oil in the range of from about 10 to about 10,000 ppm.

24. A process according to claim 19 wherein said polymer is present in said crude oil in the range from about 20 to about 5,000 ppm.

25. A process according to claim 19 wherein the molar ratio of said butadiene to said styrene is in the range of from about 90:10 to about 90.

26. A process according to claim 19 wherein the molar ratio of said butadiene to said styrene is in the range of from about 70:30 to about 75.

27. A process according to claim 19 wherein the molar ratio of said butadiene to said styrene is in the range of from about 60:40 to about 70.

28. A process according to claim 19 wherein the polystyrene equivalent molecular weight of said polymer is in the range of from about 500 to about 500,000.

29. A process according to claim 19 wherein the polystyrene equivalent molecular weight of said polymer is in the range of from about 1,000 to about 300,000.

30. A process according to claim 19 wherein the polystyrene equivalent molecular weight of said polymer is in the range of from about 25,000 to about 200,000.

31. A process according to claim 19 wherein said polymer is dispersed in a solvent before it is combined with said crude oil.

32. A process according to claim 31 wherein said solvent is selected from the group consisting of aliphatic hydrocarbons, aromatic hydrocarbons, and mixtures thereof.

33. A process according to claim 31 wherein said solvent is selected from the group consisting of pentane, hexane, cyclohexane, heptane, octane, toluene, xylenes, mesitylene, cumene, ethylbenzenes, higher alcohols, diethyl ether, tetrahydrofuran, N,N'-dimethylformamide, naphtha, aromatic naphtha, kerosene, reformate, heavy reformate, jet fuel, turbine fuel, fuel oil, distillate, heavy distillate, and mixtures thereof.

34. A process according to claim 31 wherein said solvent is selected from the group consisting of cyclohexane, toluene, xylene, and mixtures thereof.

35. A process according to claim 31 wherein said solvent is cyclohexane.

36. A process for operating a pipeline for transporting a composition which comprises a hydrocarbon fluid and a random butadienestyrene copolymer wherein said random butadiene-styrene copolymer is present in said hydrocarbon fluid in an effective amount sufficient to reduce the precipitation or deposition of wax.

37. A composition comprising a hydrocarbon fluid and a random butadiene-styrene copolymer wherein said random butadiene-styrene copolymer is present in said hydrocarbon fluid in an effective amount sufficient to reduce the precipitation or deposition of wax.

38. A composition according to claim 37 wherein said hydrocarbon fluid is a crude oil.

39. A composition according to claim 37 wherein said random butadiene-styrene copolymer is partially hydrogenated.

40. A composition according to claim 37 wherein said random butadiene-styrene copolymer is completely hydrogenated.

41. A composition according to claim 37 wherein said random butadiene-styrene copolymer is present in said hydrocarbon fluid in the range from about 1 to about 20,000 ppm by weight.

* * * * *

UNITED STATES PATENT AND TRADEMARK OFFICE
CERTIFICATE OF CORRECTION

PATENT NO.   : 5,536,706

DATED        : July 16, 1996

INVENTOR(S)  : Lyle R. Kallenbach, Marvin M. Johnson and Howard F. Efner

It is certified that error appears in the above-identified patent and that said Letters Patent is hereby corrected as shown below:

Column 8, claim 25, line 51, the number "90" should read "10:90".

Column 8, claim 26, line 54, the number "75" should read "25:75".

Column 8, claim 27, line 57, the number "70" should read "30:70".

Signed and Sealed this

Twelfth Day of November, 1996

Attest:

BRUCE LEHMAN

*Attesting Officer*    *Commissioner of Patents and Trademarks*